United States Patent [19]

LaBounty

[11] Patent Number: 4,719,975

[45] Date of Patent: Jan. 19, 1988

[54] ROTATING HAMMER-SHEAR

[76] Inventor: Kenneth R. LaBounty, Rt. 1, Box 164B, Two Harbors, Minn. 55616

[21] Appl. No.: 834,808

[22] Filed: Feb. 28, 1986

[51] Int. Cl.[4] .................................................. E21C 37/00
[52] U.S. Cl. ...................................... 173/46; 414/912; 414/740
[58] Field of Search ...................... 173/29, 46; 404/90; 414/912, 694; 299/67; 37/DIG. 3; 241/101.7, 101.2; 125/23 R; 30/134

[56] References Cited

U.S. PATENT DOCUMENTS

| 4,017,114 | 4/1977 | LaBounty | 414/740 X |
| 4,466,494 | 8/1984 | Hanson | 173/46 |
| 4,519,135 | 5/1985 | LaBounty | 30/134 |

Primary Examiner—Paul A. Bell
Assistant Examiner—James L. Wolfe
Attorney, Agent, or Firm—Palmatier & Sjoquist

[57] ABSTRACT

A rotating hammer-shear for releasable attachment to the boom structure and hydraulic system of a hydraulic excavator for the demolition of concrete structures. The hammer-shear having a heavy duty power operated shear and hammer secured to and extending from opposite ends of a common frame. The frame includes a rotational mounting. The rotational mounting provides for rotation of the hammer-shear through an arc of 360° about an axis essentially perpendicular to the line of longitudinal extension of the shear and hammer from the frame. The rotational mounting also provides for pivotal attachment of the hammer-shear to the boom structure and hydraulic system of the excavator.

10 Claims, 5 Drawing Figures

ROTATING HAMMER-SHEAR

BACKGROUND OF THE INVENTION

1. Field of the Invention

The present invention relates generally to attachments for the boom structure and hydraulic system of a hydraulic excavator or the like, and in particular to such attachments that are used for the demolition of concrete.

2. Background

The demolition of concrete structures, on a large scale, is generally accomplished with the use of wrecking balls or explosives. On a smaller scale, when, for example, only a portion of such a structure is to be dismantled, and in particular where the concrete is reinforced, a hydraulic hammer is often used to first break the concrete away from the steel reinforcing rods, after which a torch is used to cut the rods.

An example of such selective dismantling is seen in the reconstruction of the concrete roadway surface or deck of highway bridges or overpasses, wherein the old roadway must be periodically removed and replaced with new concrete. Typically, bridge deck reconstruction involves first breaking the concrete away from the reinforcing rods, generally with a hydraulic hammer, and then cutting and removing the rods with a torch. Prior to breaking up the concrete a platform is usually constructed beneath the deck to catch the pieces of concrete as they are broken away from the reinforcing rods. Thus, bridge deck repair requires a final step of picking up the concrete pieces and placing them in a dump truck so they can be hauled away. This three-step process of breaking the concrete, cutting the reinforcing rod, and then picking up the concrete pieces as they are broken away from the deck is generally very time consuming. In addition, care must be taken so as not to damage the underlying steel beam superstructure of the bridge. Due to the time involved, bridge deck reconstruction is very expensive, and thus, represents a significant portion of the costs of roadway maintenance.

SUMMARY OF THE INVENTION

It is an object of the present invention to provide for a device that can be used to quickly and efficiently demolish reinforced concrete, and in particular, the reinforced concrete decks of roadway bridges or overpasses.

It is also an object of the present invention that it be portable by releaseable attachment to the boom structure and hydraulic system of a hydraulic excavator such as a backhoe.

A feature of the present invention is a heavy duty shear. The shear includes a rigid and a moving jaw secured to a common pivot point. The shear is mounted to a frame so that the jaws extend therefrom along lines essentially parallel with the longitudinal center line thereof.

Another feature of the present invention is a hydraulic hammer secured to the end of the frame opposite the shear so that its bit extends outwardly from the frame in a direction opposite the extension of the jaws.

A further feature of the present invention is a rotational mounting. The rotational mounting allows the present invention to be rotated through an arc of 360°. Securing means are also included and integral with the rotational mounting for attaching the present invention to the boom structure and hydraulic system of the excavator. The securing means provide for articulation of the present invention through an arc of approximately 180° about the end of the boom. The 360° of rotation provided by the rotational mounting is about an axis essentially perpendicular to the axis of rotation of the present invention about the end of the boom. Thus, the invention herein can be positioned into a wide variety of orientations.

The operation of the hammer-shear of the present invention can be best understood in the context of bridge deck reconstruction. It can be appreciated that a skilled operator can position the hammer-shear herein in a vertical position so that the bit of the hammer confronts the surface of the deck. The hammer can then be operated to pierce a hole through the deck of sufficient size to allow a jaw of the shear to be inserted therein. The hammer-shear is then rotated end for end by the rotational mounting so that the shear then confronts the deck surface so that and a jaw thereof can then be inserted into the hole made by the hammer. The jaw is inserted therein by suitable movement of the present invention about the end of the boom so that the shear can be used to simultaneously cut through the concrete and reinforcing rods therein along the I-beam superstructure thereof. It is contemplated that by starting at one end of the bridge, the excavator can be used to move the present invention backwardly across the bridge as the surface thereof is dismantled. It is also contemplated that the shear can be used as a grapple to pick up and remove the pieces of concrete, and combined portions of concrete and reinforcing rod, as they are cut and broken away.

It is therefore a major advantage of the present invention that it combines a hammer and a shear into a single unit so that the use thereof can be alternated quickly as needed.

It is also a major advantage of the present invention that the particular conbination of a hammer and shear provides for a device that can quickly and efficiently handle the three steps needed in bridge deck reconstruction, namely, the breaking of the concrete, the cutting of the reinforcing rod, and the picking up of the pieces of the deck as they are cut and broken away.

The above and other objects, features, and advantages of the present invention will become more apparent from the following description of a preferred embodiment taken in conjunction with accompanying drawings.

DETAILED DESCRIPTION OF THE PREFERRED EMBODIMENT

Figure 1:
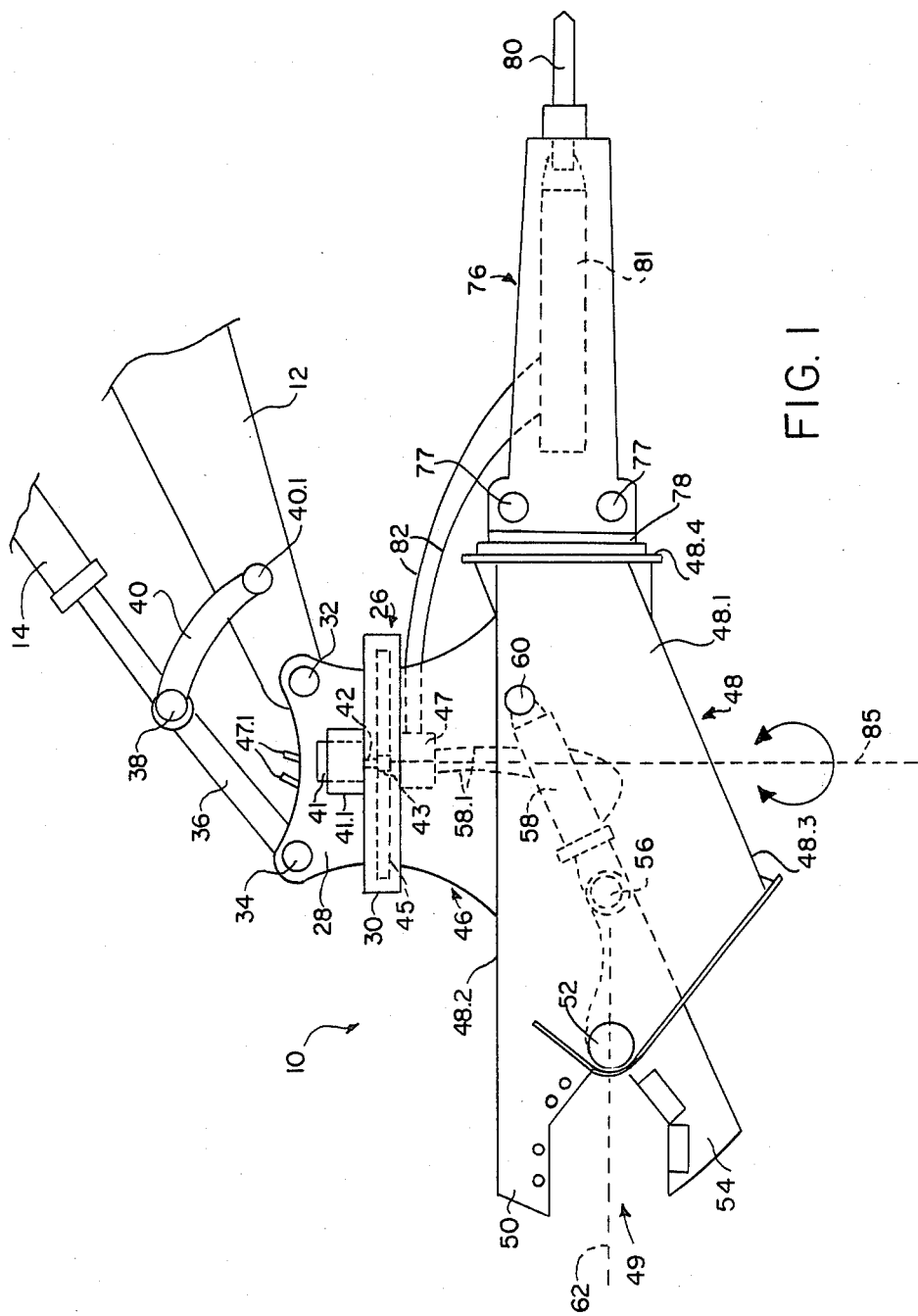
FIG. 1 is a side elevation view of the present invention shown attached to the boom structure and hydraulic system of a hydraulic excavator.

One form of the invention is illustrated in the drawings and is described herein. The rotating hammer-shear apparatus of the present invention is indicated in general by numeral 10, and as seen in FIG. 1 is shown connected to a boom 12 and a hydraulic cylinder 14 of a hydraulic excavator, not shown, such as a backhoe.

Hammer-shear 10 includes a rotational mounting generally designated 26. A pair of rigid parallel mounting ears 28 extend from and are integral with a turntable bearing plate 30, of rotational mounting 26. Mounting ears 28 include apertures therein for receiving mounting pins 32 and 34. Pin 32 provides for pivotal mounting of boom 12 to mounting ears 28. Pivot pin 34 provides for pivotal securing of linkage arm 36 to mounting ears 28. Linkage arm 36 is in turn pivotally secured to hydraulic cylinder 14 by a pivot pin 38 extending between a pair of curved linkage arms 40. Curved linkage arms 40 are also pivotally secured by a pivot pin 40.1 to boom 12.

Rotational mounting 26 includes a hydraulic motor 41 adjacent one of the mounting ears 28 and secured to the exterior of turntable plate 30 and having a shaft 42 extending downwardly therethrough. A pinion gear 43 is secured to the end of shaft 42 and the gear teeth thereof are engaged with the gear teeth of a ring gear 45. A motor shield 41.1 is integral with and extends upwardly from plate 30 around motor 41 for providing protection thereof.

Figure 3:
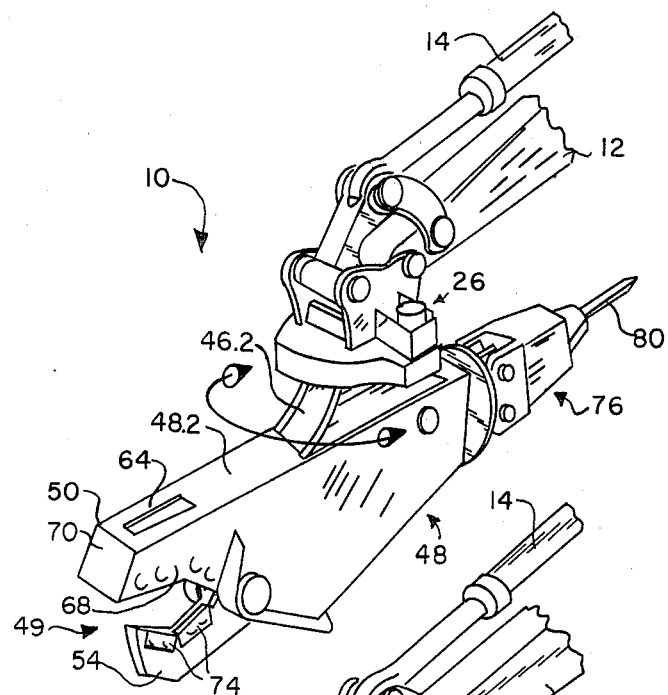
FIG. 3 is a perspective view of the present invention secured to the boom structure and hydraulic system of a hydraulic excavator.
Figure 4:
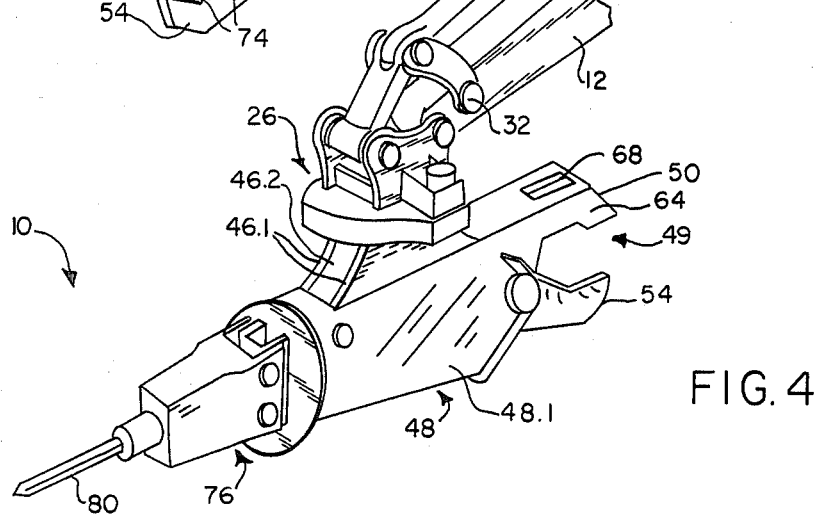
FIG. 4 is a perspective view of the present invention secured to the boom structure and hydraulic system of a hydraulic excavator.
Figure 5:
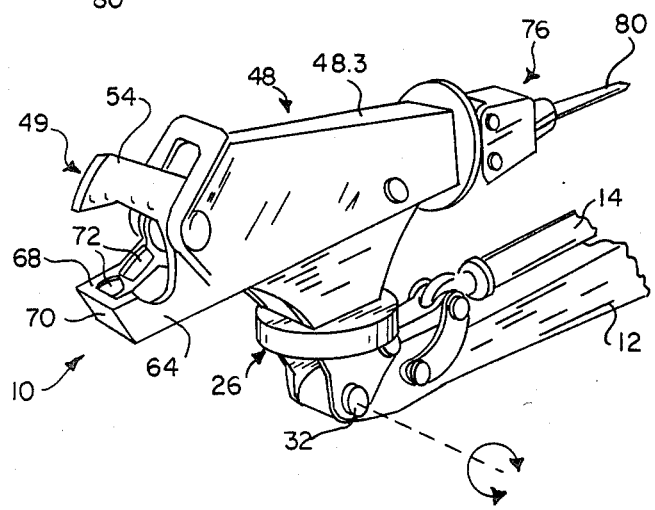
FIG. 5 is a perspective view of the present invention secured to the boom structure system of a hydraulic excavator.

Ring gear 45 is supported by bearings, not shown, between it and turntable bearing plate 30. Ring gear 45 is secured to an end of a frame support portion 46. As seen in FIGS. 3, 4 and 5, frame support portion 46 includes a pair of rigid parallel sides 46.1 and a pair of rigid ends 46.2 connecting sides 46.1. A rotary hydraulic swivel 47 is rotatively secured to plate 30 centrally of ring gear 45. Swivel 47 is connected to the hydraulic system of the excavator by hydraulic supply hoses 47.1. Rotational mountings are well known in the art, and an example of such is seen in U.S. Pat. No. 4,017,114 issued Apr. 12, 1977 to LaBounty, which patent is incorporated herein by reference.

The present invention includes a frame 48 having rigid parallel side portions 48.1, two end surfaces 48.2 and 48.3, and a rigid circular mounting plate 48.4 integral with and secured substantially perpendicularly to side portions 48.1 and end portions 48.2 and 48.3. Frame support portion 46 is integral with and extends from end portion 48.2.

Frame 48 includes a heavy duty shear 49 integral with one end thereof. Shear 49 includes an opposing rigid jaw 50 connected by a common pivot 52 to a moving jaw 54. Moving jaw 54 is secured by a pivot pin 56 to a shear activating hydraulic cylinder 58, which cylinder 58 at its opposite end is secured to frame 48 by a pin 60 extending between and secured to frame sides 48.1. A pair of supply hoses 58.1 connect cylinder 58 to swivel 47 for supplying hydraulic fluid therefrom to cylinder 58.

Opposing rigid jaw 50 is integral with frame 48 and extends therefrom in a manner parallel with centerline 62 of frame 48. Moving jaw 54, when in its normally open position, as represented in FIG. 1, also extends from frame 48 in a manner parallel with centerline 62.

Rigid jaw 50 is comprised of a guide member 64 and a shear member 68. Guide member 64 and shear member 68 lie adjacent and parallel each other and are secured together on one end by a rigid plate 70. Rigid jaw 50 and moving jaw 54 both include pairs of hardened insert bars 72 and 74, respectively, for providing the cutting edges of shear 49, as is well known in the art. Shear 49 is of the general type as disclosed in U.S. Pat. No. 4,519,135 issued on May 28, 1985 to LaBounty, which patent is incorporated herein by reference.

A hydraulic hammer 76 is secured to the end of frame 48 opposite shear 49. Hammer 76 is secured by a pair of mounting pins 77 extending through apertures in a pair of mounting ears 78, and in hammer 76. Mounting ears 78 lie parallel to each other and are integral with and extend from end plate 48.4 of frame 48. Hydraulic hammer 76 is of conventional design and includes a bit 80 extending therefrom in a manner parallel with centerline 62, and in a direction opposite from the extension of jaws 50 and 54. Hammer 76 includes a hydraulically reciprocating driver 81 for providing the driving of bit 80. Driver 81 is hydraulically connected to swivel 74 by supply hoses 82.

The operation of Shear 49 of the present invention can be appreciated wherein extension of cylinder 58 causes moving jaw 54 to swing relative to rigid jaw 50 so that moving jaw interleaves between guide member 64 and shear member 68. The swinging of moving jaw 54 causes hardened insert bars 72 and 74 to slide by each other in a shearing relationship. Thus, shear 49 provides for cutting of various material placed between saws 50 and 54. In particular, it has been found that shear 49 is suitable for the cutting of reinforced concrete whereby the concrete and reinforcing rod thereof can be simultaneously crushed and cut.

The operation of hammer 76 of the present invention can be appreciated wherein, driver 81 of hammer 76 provides for the reciprocating operation of bit 80 in an inwardly and outwardly direction parallel with centerline 62. Thus, hammer 76, as is well known in the art, can be used to break up various structures, and in particular, reinforced concrete.

The operation of rotational mounting 26 can be understood, wherein rotation of shaft 42 of hydraulic motor 41 causes pinion gear 43 to rotate ring gear 45. As ring gear 45 is secured to support portion 46 and portion 46 is in turn secured to frame 48, shear 49 and hammer 76 can be rotated through an arc of 360° about the central axis 85 of rotational mounting 26, as indicated by the arrows seen in FIGS. 1, 2 and 3. A fuller understanding of the positioning ability provided for by rotational mounting 26 can be appreciated by reference to FIGS. 3 and 4. As seen therein, hammer-shear 10 is suspended in a vertical position below boom 12. In particular, as seen in FIG. 3, shear 49 is facing forwardly of boom 12, and, as seen in FIG. 4, hammer 76 is facing forwardly of boom 12. It can be understood that rotational mounting 26 provides for orienting of hammer-shear 10 into the positions, seen in FIGS. 3 and 4, and any position therebetween, through clockwise or counterclockwise rotation thereof through a plane parallel with centerline 62 and perpendicular to axis 85.

Hammer-shear 10 can also be rotated about the axis of pin 32 at the end of boom 12, through an arc of approximately 180°, as indicated by the arrow in FIG. 5. Such boom rotation can be more fully understood by referring to both FIGS. 4 and 5. As seen in FIG. 4, hammer-shear 10 is suspended in a vertical orientation below boom 12. Hammer-shear 10 can be swung about the axis of pin 32 into the vertical position, as seen in FIG. 5, above boom 12, by suitable retraction of cylinder 14. It can be understood that the axis of rotation about pin 32 is orthogonal to the axis of rotation provided for by mounting 26. Therefore, the combination of these two axes of rotation allows hammer-shear 10 to be oriented into a wide variety of positions suitable for the demolition of various structures. It can also be appreciated that frame support portion 46 provides for extending hammer 76 and shear 49 away from boom 12 and hydraulic cylinder 14 so that they do not interfere therewith, during such rotational positioning.

Figure 2:
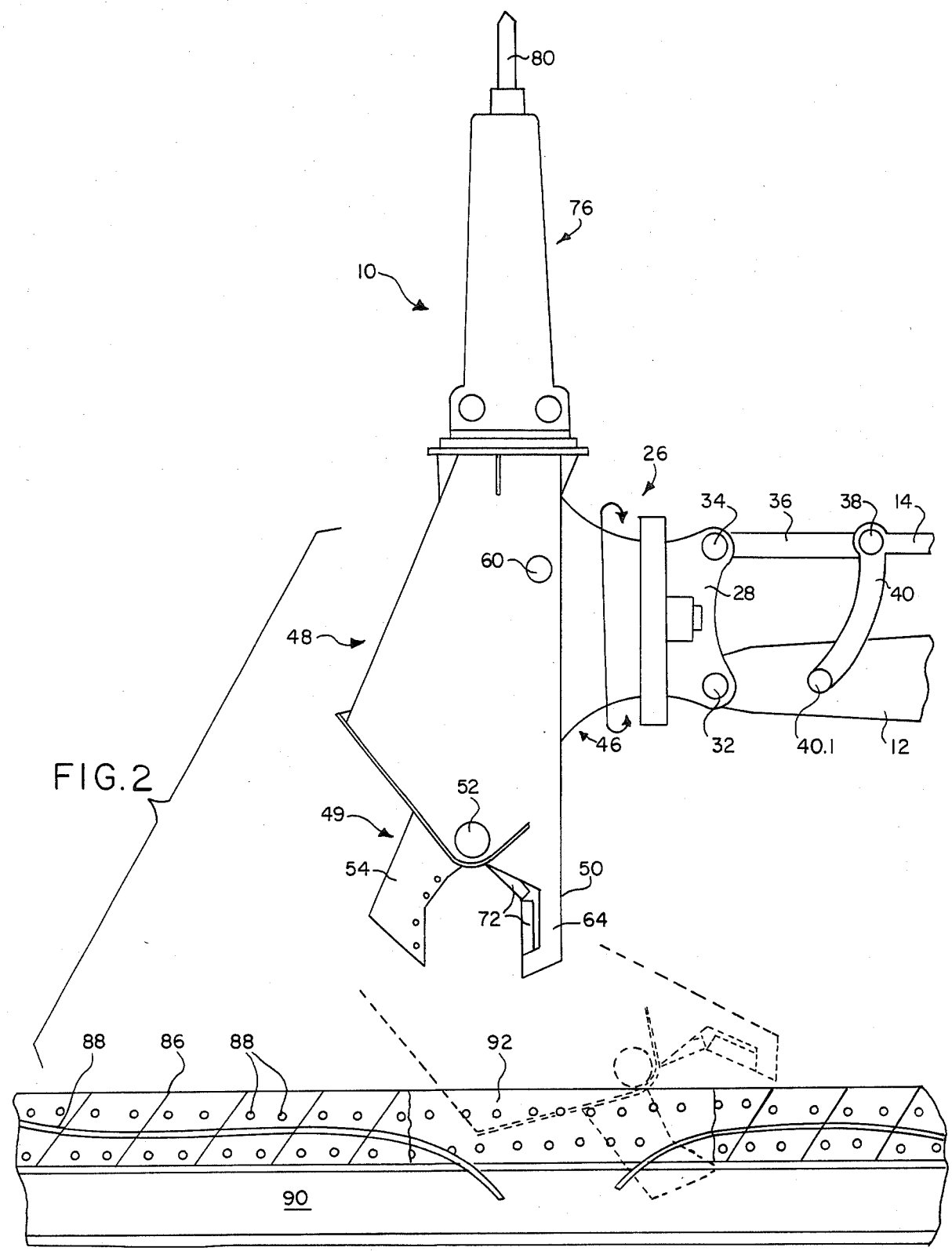
FIG. 2 is a side elevation view of the present invention shown positioned in a vertical orientation with the shears thereof confronting a horizonal portion of reinforced concrete bridge deck shown in sectional view.

The overall operation of the present invention can be best understood in the context of bridge deck reconstruction, as represented in FIG. 2. As seen therein, hammer-shear 10 is oriented in a vertical direction wherein shear 49 is confronting a horizontal bridge deck surface 86. Deck 86 is comprised of reinforced concrete having various reinforcing rods 88, and supported by bridge I-beam structure 90. A hole 92 is first cut through deck 86 by suitable application of hammer 76. Thus, after hole 92 is produced, rotational mounting 26 is used to rotate hammer-shear 10 end-for-end so that shear 49 then confronts the surface of deck 86, so that the exposed reinforcing rod can be cut thereby. Shear 49 can then be used to cut deck 86 in a direction along I-beam 90. The particular positioning of shear 49 for cutting of deck 86, requires the rotation of hammer-shear 10 about the axis of boom pivot pin 32 by the extension of cylinder 14. In this manner, hammer-shear 10 is positioned towards a more vertical orientation with respect to the deck with shear 49 facing towards the excavator so that shear 49 can cut along I-beam 90 through deck 86. This deck cutting position of shear 49 is seen in the dotted outline thereof in FIG. 2. It will also be understood by those skilled in the art that shear 49 can also be used to pick up portions of the deck as the concrete and reinforcing rod thereof is sheared away. It is also contemplated that by appropriate movement of hammer-shear 10 by a skilled operator shear 49 can be used to peel or scrape away that portion of deck 86 lying directly over the I-beam structural support. It will, therefore, be understood that the present invention by attachment to the boom structure and hydraulic system of an excavator can be used to remove deck 86 as the excavator moves backwardly across the deck from one end of the bridge to the other.

Thus, a major advantage of the present invention is its ability to alternate between the hydraulic hammer and a heavy duty shear as is needed during the demolition of various structures, in particular those structure including reinforced concrete.

What is claimed is:

1. A rotating hammer shear for demolishing structures of material such as concrete and for releasable attachment to a boom structure and hydraulic system of a hydraulic excavator, comprising:
   (a) a frame,
   (b) a power operated heavy duty shear secured to one end of the frame and extending therefrom,
   (c) a power operated hammer secured to an end of the frame opposite the shear and extending therefrom away from the shear,
   (d) rotational mounting means secured to the frame for rotating the frame through an arc of 360 about an axis transverse to the extension of the shear and hammer from the frame, and
   (e) securing means for providing pivotal attachment of the rotational mounting means to the boom structure and hydraulic system of the excavator.

2. The rotating hammer-shear as defined in claim 1, wherein the heavy duty shear includes a rigid jaw integral with the frame and a moving jaw pivotally secured to the rigid jaw.

3. The rotating hammer-shear as defined in claim 2, wherein the rigid jaw includes a guide portion and a shearing portion lying adjacent and parallel to each other and secured to each other on one end by a rigid plate.

4. The rotating hammer-shear as defined in claim 3, wherein the rigid jaw and the moving jaw include hardened shearing inserts.

5. The rotating hammer-shear as defined in claim 1, wherein both the shear and the hammer are elongate and respectively extend in opposite directions from the frame.

6. A rotating hammer-shear for demolishing structures of material such as concrete, and for releasable attachment to a boom structure and hydraulic system of a hydraulic excavator, comprising:
   (a) a frame,
   (b) a power operated, heavy duty shear secured to one end of the frame and extending therefrom, the shear including a rigid jaw integral with the frame and a moving jaw pivotally secured to the rigid jaw and the rigid jaw including a guide portion and a shearing portion lying adjacent and parallel to each other and secured to each other on one end by a rigid plate and the rigid jaw and moving jaw including hardened shearing inserts,
   (c) a power operated hammer secured to an end of the frame opposite the shear and extending therefrom away from the shear,
   (d) rotational mounting means secured to the frame for rotating the frame through an arc of 360° about an axis transverse to the extension of the shear and hammer from the frame, and
   (e) securing means for providing pivotal attachment of the rotational mounting means to the boom structure and hydraulic system of the excavator.

7. A rotating hammer-shear for demolishing structures of material such as concrete, and for releasable attachment to a boom structure and hydraulic system of a hydraulic excavator, comprising:
   (a) a frame having first and second ends,
   (b) a power operated heavy duty shear secured to the first end of the frame and extending therefrom,
   (c) a power operated hammer secured to the second end of the frame and extending therefrom away from the shear,
   (d) rotational mounting means secured to the frame for rotating the shear and hammer end-for-end about an axis transverse to the extension of the shear and hammer from the frame, and
   (e) securing means for providing pivotal attachment of the rotational mounting means to the boom structures and hydraulic system of the excavator.

8. The rotating hammer-shear as defined in claim 7, wherein the heavy duty shear includes a rigid jaw integral with the frame and a moving jaw pivotally secured to the rigid jaw.

9. The rotating hammer-shear as defined in claim 8, wherein the rigid jaw includes a guide portion and a shearing portion lying adjacent and parallel to each other and secured to each other on one end by a rigid plate.

10. The rotating hammer-shear as defined in claim 7, wherein both the shear and the hammer are elongate and respectively extend in opposite directions from the frame.

* * * * *